F. L. Walker.
Leather Cutter.
Nº 86,611. Patented Feb. 2, 1869.
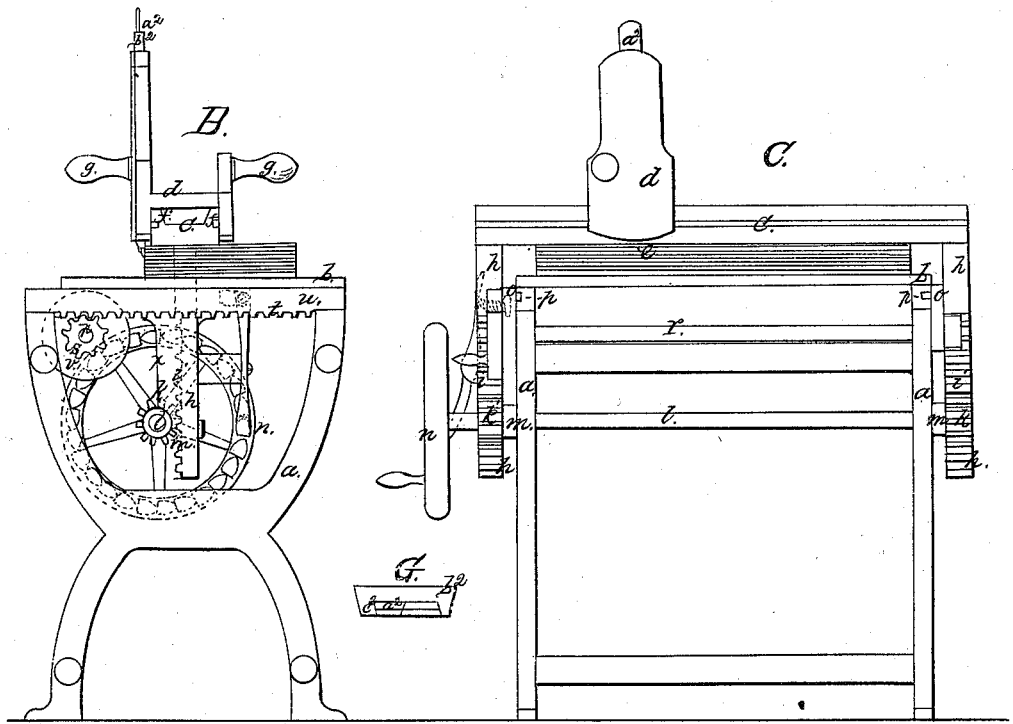
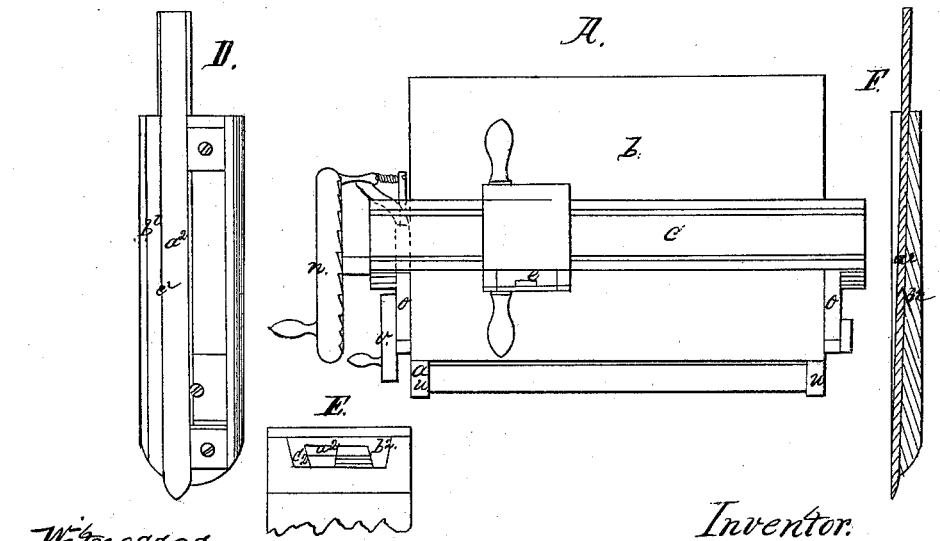
Witnesses.
J. B. Kidder.
C. Warren Brown.
Inventor.
F. L. Walker
by his att'ys
Crosby & Gerber

F. L. WALKER, OF BOSTON, MASSACHUSETTS.

Letters Patent No. 86,611, dated February 2, 1869.

IMPROVED MACHINE FOR CUTTING UP LEATHER-STOCK, &c.

The Schedule referred to in these Letters Patent and making part of the same.

*To all whom it may concern:*

Be it known that I, F. L. WALKER, of Boston, in the county of Suffolk, and State of Massachusetts, have invented an improved Machine for Cutting up Leather-Stock, Paper, &c.; and I do hereby declare that the following, taken in connection with the drawings which accompany and form part of this specification, is a description of my invention, sufficient to enable those skilled in the art to practise it.

The invention relates to the cutting-mechanism of machines for cutting up leather-stock for book-binders' use, &c., with reference to such arrangement of the cutter-mechanism as shall enable the reciprocating cutter to be moved crosswise over the stock-supporting table, so that the stock, whether in a pile, or in single-sheet form, upon the table, may be cut into parallel strips, of the same or of variable widths, without disturbance of the stock by any movement of the table which supports it.

The invention consists in combining a stationary bed, or work-supporting table, with a cutter-frame, which has provision for both vertical and lateral movement, the cutter-stock being supported and sliding upon the cutter-frame in a direction at right angles with the lateral movement of the cutter-frame.

The drawings represent a machine embodying my improvement.

A shows a plan of the machine.

B, an end elevation.

C, a front elevation.

$a$ denotes the frame of the machine, having upon its top a flat bed, or table, $b$, the frame and table being both stationary, and the stock to be cut being laid upon the top of the table.

$c$ denotes the frame, which supports the stock $d$, that carries the cutter $e$, the stock sliding upon ways, $f$, and having suitable handles, $g$, by which it may be reciprocated.

The cutter-frame is mounted upon two vertical posts $h$, each of which has, on one face, gear-teeth $i$, into which the teeth of a pinion, $k$, mesh, the two pinions being fixed on a shaft, $l$, turning in bearings, $m$.

By turning a hand-wheel, $n$, at one end of the shaft $l$, the posts may be raised and lowered, and the cutter-frame thereby carried up, for the introduction of stock beneath it, or the removal of the stock, after being cut, or for the lateral movement of the cutter-frame, after once cutting the stock, and preparatory to again cutting it.

The bearings $m$ are fixed upon the lower ends of lugs $x$, projecting down from horizontal rails $o$, which are supported by and slide on ways $p$ on the frame $a$, these rails also having lugs $q$, in which are bearings for supporting a shaft, $r$, carrying gear-pinions, $s$, which mesh into the teeth of stationary gear-racks, $t$, on the bottom of the cross-rails $u$ of the frame $a$.

By turning a hand-wheel, $v$, on one end of the shaft $r$, the cutter-frame may be fed crosswise of the table, in either direction.

A pile, or a single piece of stock, being placed upon the table, the wheel $n$ is turned until the cutter-frame is brought down upon the stock, the stock having been so placed, or the cutter-frame so moved, laterally, as to bring the stock into position for the cutter, in its reciprocating movement, to cut the stock in the line desired.

The stock is then cut, by reciprocation of the cutter, by hand, a suitable spring-pawl, $v$, locking into a ratchet on the wheel $n$, holding the cutter-frame down during the cutting-operation.

The cut having been effected, the wheel $n$ is released from the pawl, and is turned back, raising the cutter from the stock.

The cutter-frame is then moved laterally, without disturbance of the table, or the stock thereon, until the cutter has traversed a distance equal to the width to which the stock is to be cut, when the cutter-frame is again fed down to the stock, and the new cut is effected as was the previous one.

This construction and arrangement enables stock to be very rapidly and very accurately divided, there being no liability in the stock to become displaced under the rapid movements of the mechanism.

To so fasten the shank $a^2$ of the cutter securely in its holder, $b^2$, that it cannot turn or twist while in use, it is made dovetailing in cross-section, one edge corresponding to an incline, $c^2$, of the holder, under which such edge is pressed, (as seen at D and E,) while against the opposite edge of the cutter-shank, keys $d^2$ (or the inclined under surfaces of the heads of screws $e^2$) are screwed, each key having an edge the converse of the inclined edge of the cutter-shank against which it bears.

To prevent the face of the cutter-shank, just above the cutting-edge, from hugging against the edges of the upper sheets after cutting them, I make the face of the holder against which the shank is supported retreating, (as seen at F,) contact of the shank with the cut edges ceasing as soon as the cutting-edge passes below the sheets cut, as will be readily understood.

I claim, in a machine having a vertically-moving cutter-frame, which carries a reciprocating cutter, the combination of a stationary stock-supporting bed and a laterally-moving cutter-frame, the whole being arranged to operate in the manner and for the purpose substantially as described.

I also claim a cutter, secured in its holder by means of fastenings which act against one of the inclined edges of the cutter, substantially as described.

I also claim a cutter-holder, having the face against which the cutter-shank is fastened inclined, substantially as described.

Witnesses:  F. L. WALKER.
J. B. CROSBY,
FRANCIS GOULD.